United States Patent [19]
Orloff et al.

[11] 3,982,477
[45] Sept. 28, 1976

[54] MOLD WITH PLUG TAKE-UP MECHANISM

[75] Inventors: Daniel L. Orloff; Charles H. Johnson, both of Madison, Wis.

[73] Assignee: Oscar Mayer & Co. Inc., Madison, Wis.

[22] Filed: Mar. 11, 1975

[21] Appl. No.: 557,300

[52] U.S. Cl. .................................. 99/351; 99/441; 220/93; 249/82
[51] Int. Cl.² ........................................ A47J 27/20
[58] Field of Search ............ 99/351, 353, 441, 449; 249/82, 158; 220/93

[56] References Cited
UNITED STATES PATENTS
3,017,822  1/1962  Hawley ............................ 99/351 X

*Primary Examiner*—Peter Feldman
*Assistant Examiner*—Alan Cantor
*Attorney, Agent, or Firm*—Lockwood, Dewey, Zickert & Alex

[57] ABSTRACT

A mold for processing a food material, including a plug and ratchet take-up mechanism for accommodating expansion and contraction of the food product. The plug is provided with ratchet arms having ratchet teeth and the take-up mechanism includes spring biased pins or pawls coacting with the ratchet teeth.

13 Claims, 10 Drawing Figures

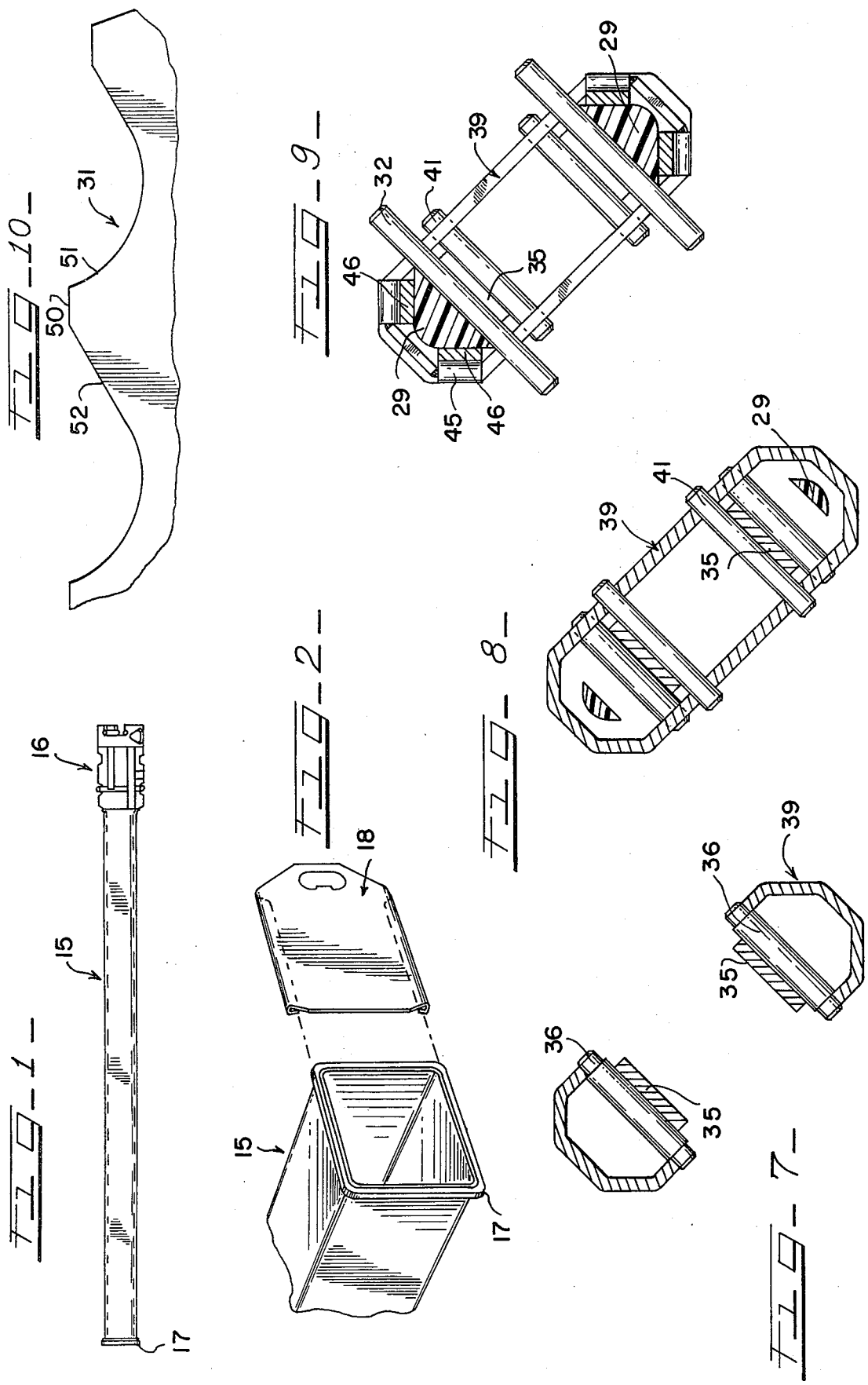

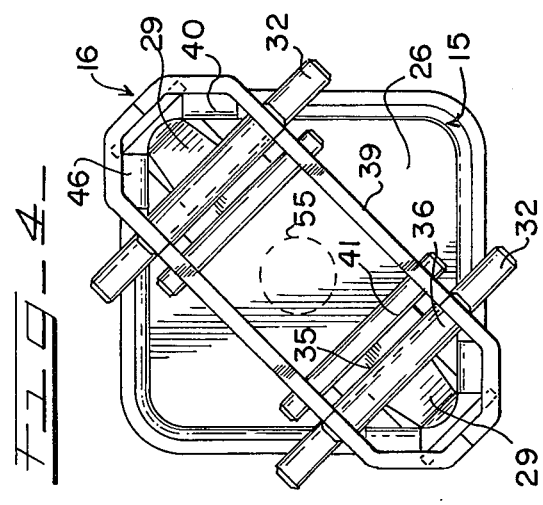
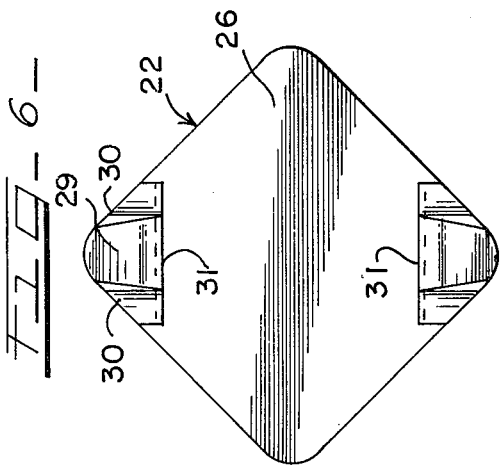
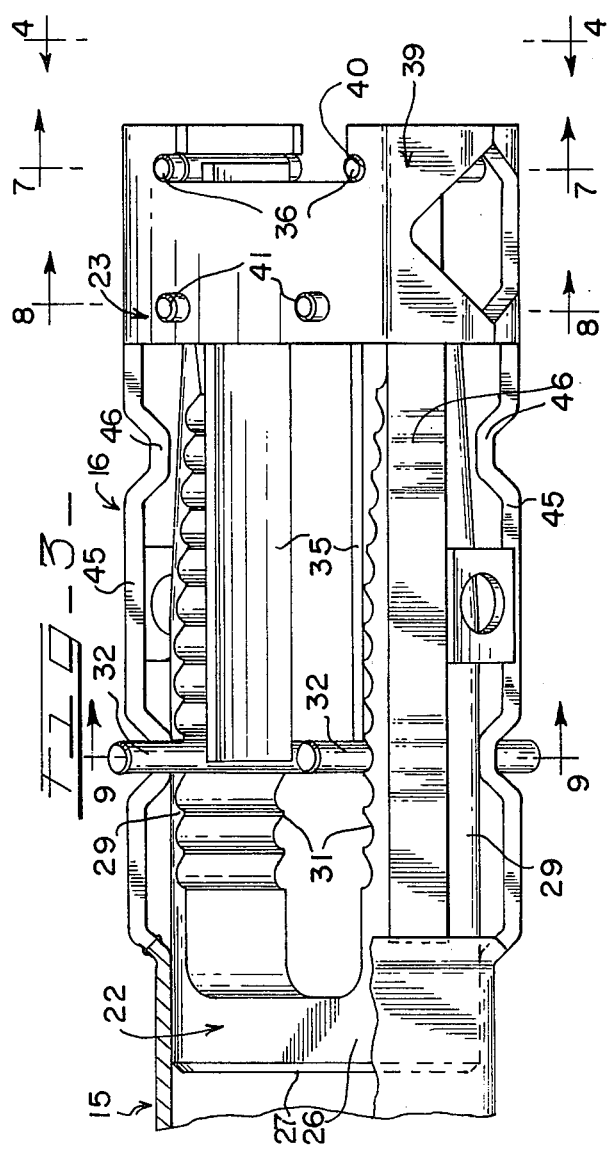
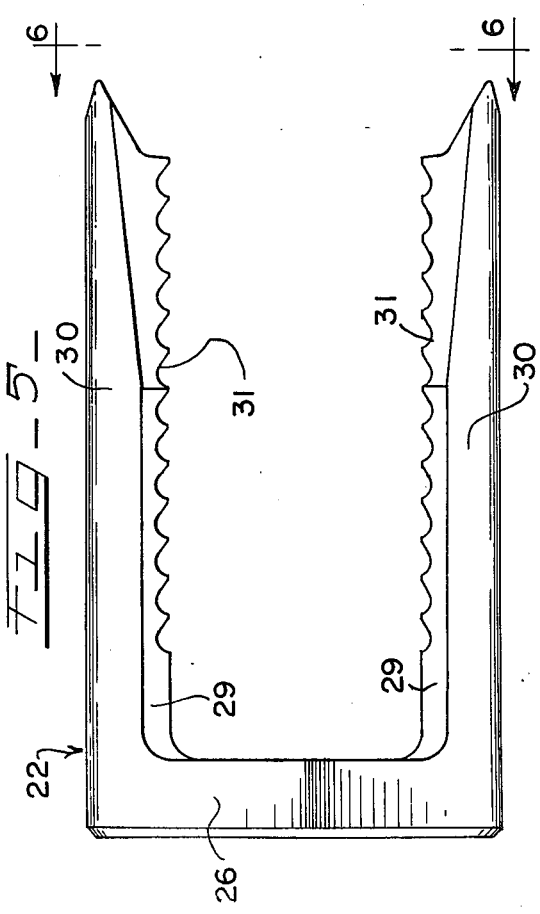

MOLD WITH PLUG TAKE-UP MECHANISM

This invention relates in general to a mold for processing a food material, and more particularly, to a mold having a plug and suitable take-up mechanism, such as a ratchet take-up mechanism, for accommodating expansion and contraction of the food product during processing.

It has been known to process food materials in loaf molds to produce a loaf food product, and especially in connection with loaf meat products. A mold usually of metal, such as stainless steel, is filled with a stuffable meat material, such as sausage batter or chunk meat, and the mold is then subjected to heat to raise the temperature of the meat material and cook it, and thereafter the mold is subjected to chilling for chilling of the meat material prior to removal from the mold. The cooking of raw sausage batter in a mold causes expansion of the meat and the chilling of the meat causes contraction or shrinkage. Heretofore, it has been known to accommodate such expansion and contraction by spring biasing plugs against the meat material during the processing. In such a unit, the force applied to the plug varies according to the flexing of the spring. It can be appreciated the excessive meat pressures can be relieved to prevent distortion of a mold, while it is desirable to squeeze the meat during contraction in order to provide a uniform in cross section loaf meat product.

The product and ratchet take-up mechanism of the present invention are unique in that a controlled pressure can be maintained on the product at all times. The plug is positionable within the interior of a mold and includes a base or piston portion conforming to the cross section of the mold and a pair of ratchet or guide arms extending from the base and provided with ratchet teeth. Spring biased pins or pawls are mounted for coaction with the ratchet teeth to prevent movement of the plug during expansion until the force of the spring biased pawls is overcome to allow slippage of the ratchet teeth relative to the pawls. During shrinkage of the product being processed, a force can be applied to the plug to squeeze the meat material, wherein the pawl and ratchet portion of the mechanism serve to hold the plug in position and maintain a maximum set pressure on the meat material.

The mold with the plug and ratchet take-up mechanism of the invention is especially useful where a plurality of molds may be interconnected together in a magazine that is transported automatically through a plurality of molds in a continuous loaf processing system. However, it must be appreciated that the plug and ratchet take-up mechanism of the invention may be used in connection with single or multiple mold requirements.

It is therefore an object of the present invention to provide a mold with a new and improved take-up mechanism for accommodating the expansion and contraction of a food product being processed in the mold.

Another object of this invention is in the provision of a loaf mold for producing a loaf food product having improved yield by cooking and chilling of a food material held by the mold, and which includes a plug and ratchet take-up mechanism for accommodating expansion and contraction of the food material.

Other objects, features and advantages of the invention will be apparent from the following detailed disclosure, taken in conjunction with the accompanying sheets of drawings, wherein like reference numerals refer to like parts, in which:

FIG. 1 is a side elevational view of a mold having a plug and ratchet take-up mechanism;

FIG. 2 is an enlarged fragmentary view of the end of the mold in FIG. 1 which is flanged for receiving a slip-on cover;

FIG. 3 is an enlarged fragmentary view of the mold and illustrating the plug and ratchet take-up mechanism arranged at one end of the mold;

FIG. 4 is an end elevational view of the plug and ratchet take-up mechanism shown in FIG. 3 and taken generally along line 4—4 of FIG. 3;

FIG. 5 is a side elevational view of the plug removed from the ratchet take-up mechanism and mold;

FIG. 6 is an end elevational view of the plug of FIG. 5 and taken substantially along line 6—6 of FIG. 5;

FIG. 7 is a detailed cross-sectional view taken substantially along line 7—7 of FIG. 3;

FIG. 8 is a detailed cross-sectional view taken substantially along line 8—8 of FIG. 3;

FIG. 9 is a detailed cross-sectional view taken substantially along line 9—9 of FIG. 3; and FIG. 10 is a fragmentary enlarged elevational view of the ratchet teeth formed on the ratchet or guide arms of the plug.

Referring now to the drawings, and particularly to FIG. 1, a mold 15 is illustrated as having the plug and ratchet take-up mechanism 16 according to the invention. The mold 15, as seen also in FIG. 2, includes a flanged end 17 closable by the application of a slip-on cover 18. The mold 15 may be made of any suitable material. Preferably, the mold is made of stainless steel. Similarly, the mold cover 18 is also made of stainless steel. While a slip-on cover is shown, it can be appreciated that any desirable cover may be used to close one end of the mold.

It can be readily recognized that the mold 15 may have any desired cross-sectional shape although it is illustrated as being square in shape. The mold is used for processing a raw food material. Accordingly, a food material in stuffable form may be first introduced into the mold and thereafter processed. For example, a raw sausage meat batter may be suitably loaded into the mold, after which the slip-on cover 18 is placed on the flanged end. Thereafter, the mold is suitably subjected to heat for cooking the raw meat material. The loaf meat may then thereafter be chilled, knocked out, sliced and packaged for sale.

The plug and suitable take-up mechanism of the invention preferably includes generally a plug 22 and a ratchet take-up mechanism 23. The ratchet take-up mechanism 23 positionably controls the plug relative to the mold and maintains a maximum set pressure on the meat material in the mold to enable production of a quality product. While the mold is preferably of metal, the plug 22 is preferably of plastic, such as Celcon, The plug 22 includes a base or piston portion 26 having a cross-sectional shape conforming to the internal cross-sectional shape of the mold 15. It can be appreciated the cross-sectional shape of the mold may be of any suitable configuration. It further may be appreciated that the dimensions of the plug piston portion 26 relative to the mold 15 is such as to permit sliding movement of the piston portion within the mold. The forward side of the piston portion 26 includes a face 27 which engages the meat material within the mold.

Therefore, the piston portion 26 defines the one end wall of the mold and closes one end of the mold.

Ratchet or guide arms 29 extend from the rear side of the piston portion 26 and are formed with outer guide surfaces 30, FIG. 6, that will assist in guidably maintaining the piston portion 26 perpendicular to the side walls of the mold 15 during movement of the plug through the mold. Ratchet teeth 31 are formed along the inner sides of the arms 29 for coacting with position-holding means in the form of ratchet pins or pawls 32. It may be noted that a pair of guide arms 29 are shown and are preferred although it can be appreciated that only a single arm may be provided in some instances.

The ratchet pins or pawls 32 are cylindrical and spring biased into engagement with the ratchet teeth 31 by means of ratchet springs 35. The ratchet springs 35 are connected on one end to the pins 32 and at the other end to anchoring pins 36.

A somewhat rectangular in cross section frame 39 includes opposed slots or seats 40 which freely receive the anchoring pins 36. The ratchet springs 35 are held in place to apply a suitable force through the ratchet pawls 32 to the ratchet teeth 31 by a pair of fulcrum pins 41 held in the frame 39. As seen particularly in FIGS. 4, 8 and 9, the fulcrum pins 41 act as a stop to the ratchet springs 35 to maintain a continuing pressure on the ratchet teeth by the ratchet pawls 32. It may also be appreciated the ratchet springs 35 may easily be disassembled from the frame 39 by removing the fulcrum pins 41 to allow the anchoring pins 36 to be lifted from the slots 40 for removal of the springs. The plug 22 may also be easily removed from the mold and the ratchet mechanism.

Two pairs of guide bars 45, each of which is formed to have guide ridges 46, serve to interconnect the frame 39 with the mold 15 and to guide the plug when it is at the ratchet take-up end of the mold. Particularly, the ridges 46, as seen in FIG. 4, define guideways for the guide surfaces 30 of the ratchet arms 29. The plug, as shown in FIG. 3, is in the stuff position wherein the mold is ready for a stuffing operation. Movement of the plug outward of the mold so that the face 27 is spaced from the end of the mold essentially arranges the plug in a clean-up position to facilitate clean-up of the interior of the mold and the plug and also to facilitate coating of the interior of the mold and the face of the plug with a suitable release agent prior to stuffing the mold with a suitable stuffable meat material.

The specific shape of the ratchet teeth 31 is illustrated in FIG. 10, wherein each tooth includes a small flat land 50 extending generally parallel to the axis of the guide arms 29, a steeply sloped land 51 over which the ratchet pawl or pin first slips or slides during the expansion of the food product within the mold, and a gradually or shallowly sloped land 52 over which the pawl first slips or slides during the contraction of the food product within the mold. It can be appreciated the size and pitch of the teeth may be changed. Further, it may be appreciated that the shape of the pawls and the loading of the springs 35 may be changed to suit a particular product. However, the shape of the pawls would be coordinated with the ratchet teeth.

During the processing of a meat material in the mold, where cooking of the meat material causes expansion, the plug and ratchet take-up mechanism maintains the internal pressure within the mold below a set maximum. When the set maximum is exceeded, the plug will move in a direction outward of the mold where the ratchet teeth 31 slip against the ratchet pawls 32, as dictated by the spring forces applied to the ratchet teeth through the pawls by the ratchet springs 35. During chilling of the product, a squeezing force is applied to the meat material by applying a force to the backside of the plug 22, such as by a ram, as depicted in dotted lines and indicated by the numeral 55 in FIG. 4. The force applied by the ram would be adjusted to match the internal maximum set pressure for the molds. At the completion of the cooking and chilling process cycle, a piston portion 26 of the plug 22 is utilized to knock the ready-to-eat product out of the mold. A pressure is applied to the backside of the plug with a suitable ram, such as to drive the product from the mold. During clean-up of the mold, the plug 22 is held within the guides 45 in the clean-up position where the plug is fully exposed outside of the mold. In order to back the plug out of the mold, the pawls may be deactivated by applying a suitable force to them to take them out of engagement with the ratchet teeth.

From the foregoing it can be appreciated that the plug and ratchet take-up mechanism of the invention maintains a controlled pressure on the product in the mold during processing and also facilitates removal of the product from the mold after processing.

Although the preferred take-up mechanism is a ratchet take-up mechanism as described above, other mechanisms can be used. For example, the take-up mechanism may be based upon friction wherein a predetermined force is required to overcome the friction and thereby move the plug.

It will be understood that modifications and variations may be effected without departing from the scope of the novel concepts of the present invention, but it is understood that this application is to be limited only by the scope of the appended claims.

The invention is hereby claimed as follows:

1. A tubular loaf mold adapted for receiving a stuffable food material to be processed for continuously producing a loaf food product comprising: an elongated hollow body open at both ends, means on one end for receiving a cover for closing said one end, a plug positionable and movable within said body, and a take-up mechanism at the end of the body opposite said one end coacting with the plug to accommodate expansion and contraction of the food material during processing thereof, said take-up mechanism including means connected to the mold and coacting with said plug for retarding movement of said plug in both directions, wherein a predetermined force against the plug is necessary to move same in the mold.

2. The mold defined in claim 1, wherein the mold is metal and the plug is plastic.

3. A tubular loaf mold adapted for receiving a stuffable food material to be processed for continuously producing a loaf food product comprising: an elongated hollow body open at both ends, means on one end for receiving a cover for closing said one end, a plug positionable and movable within said body, and a take-up mechanism at the end of the body opposite said one end coacting with the plug to accommodate expansion and contraction of the food material during processing thereof, said take-up mechanism is a ratchet take-up mechanism which includes a spring biased ratchet pin and said plug includes an arm having ratchet teeth coacting with said ratchet pin.

4. The mold defined in claim 3, wherein the ratchet take-up mechanism includes a pair of spring biased ratchet pins and said plug includes a pair of arms having ratchet teeth coacting with said ratchet pins.

5. The mold defined in claim 4, wherein the ratchet teeth include a flat land extending generally parallel to the arm, a steeply sloped land against which the pin slides during expansion and a gradual sloped land against which the pin slides during contraction.

6. A plug take-up mechanism for a loaf mold comprising: a plug positionable and movable within the mold, said plug including, a base having a cross section conforming to the cross section of the mold interior and at least one arm extending from the rear side of the base, a plurality of ratchet teeth formed on the arm, a spring biased pawl engaging the teeth and applying a force to prevent movement of the plug until a predetermined force is applied thereto, and means at the end of the mold for supporting said spring biased pawl.

7. The mechanism defined in claim 6, wherein a pair of arms extend from the rear side of the plug base coacting with a pair of spring biased pawls and guide means extending from the mold to guide the plug relative the mold when it is retracted from the mold into a clean-up position.

8. The mechanism defined in claim 7, wherein said arms including guide surfaces to assist guiding of the plug in the mold.

9. In combination with a tubular loaf mold for processing a stuffable meat material to produce a loaf meat product, wherein the mold includes a removable closure member on one end, and a plug take-up mechanism at the other end for accommodating expansion and contraction of the meat material, said mechanism comprising: a plug having a piston portion cross-sectionally mating for slidable movement with the interior of the mold and a pair of opposed arms extending rearwardly from the piston portion having guide surfaces slidably engageable with the mold interior and a plurality of ratchet teeth, a plurality of guide bars extending from said mold for guidably supporting the arms outside the mold, a frame attached to the outer ends of the guide bars, pawls engaging the ratchet teeth of the arms, and springs having the pawls attached to one end and being anchored at the other end to the frame for biasing the pawls into engagement with the teeth, wherein a predetermined force is necessary to move the plug.

10. The combination defined in claim 9, wherein the teeth are defined by a flat land extending generally parallel to an arm, a gradually sloped land on one side of the flat land facing the mold against which the pawl slides during contraction, and a steeply sloped land facing away from the mold against which the pawl slides during expansion.

11. In combination with a tubular loaf mold for processing a stuffable meat material to produce a loaf meat product, wherein the mold includes a removable closure member on one end, a plug take-up mechanism at the other end for accommodating expansion and contraction of the meat material, said mechanism comprising: a plug having a piston portion cross-sectionally mating for slidable movement with the interior of the mold and a pair of opposed arms extending rearwardly from the piston portion having guide surfaces slidably engageable with the mold interior, means connected to said mold and engaging said plug arms for retarding movement of said plug, wherein a predetermined force against the plug is necessary to move same in the mold.

12. The combination as defined in claim 11, wherein said means is spring biased.

13. In combination with a tubular loaf mold for processing a stuffable meat material to produce a loaf meat product, wherein the mold includes a removable closure member on one end, a plug take-up mechanism at the other end for accommodating expansion and contraction of the meat material, said mechanism comprising: a plug having a piston portion cross-sectionally mating for slidable movement with the interior of the mold and a pair of opposed arms extending rearwardly from the piston portion having guide surfaces slidably engageable with the mold interior, a plurality of guide bars extending from said mold for guidably supporting the arms outside the mold, a frame attached to the outer ends of the guide bars, holding means engaging the arms, and springs engaging said holding means at one end and being anchored at the other end to the frame for biasing said holding means into engagement with the arms, wherein a predetermined force against the plug is necessary to move same in the mold.

* * * * *